United States Patent [19]

Albitre

[11] Patent Number: 4,756,541
[45] Date of Patent: Jul. 12, 1988

[54] BICYCLE TRAILER

[76] Inventor: Eugene E. Albitre, 3401 Aslin St., Bakersfield, Calif. 93312

[21] Appl. No.: 56,941

[22] Filed: Jun. 3, 1987

[51] Int. Cl.⁴ ............................................. B62D 63/06
[52] U.S. Cl. ...................................... 280/204; 280/78
[58] Field of Search ........................... 280/204, 292, 78

[56] References Cited

U.S. PATENT DOCUMENTS

| | | | |
|---|---|---|---|
| 2,468,894 | 5/1949 | Peek | 280/204 |
| 2,571,595 | 10/1951 | McLeary | 280/52 |
| 3,567,249 | 3/1971 | Robinson | 280/204 |
| 3,877,723 | 4/1975 | Lahey et al. | 280/204 |
| 4,055,354 | 10/1977 | Sharpe | 280/78 X |
| 4,266,793 | 5/1981 | Pryor | 280/204 |
| 4,511,155 | 4/1985 | Galloway . | |

FOREIGN PATENT DOCUMENTS

| | | | |
|---|---|---|---|
| 810112 | 8/1951 | Fed. Rep. of Germany | 280/204 |
| 794900 | 2/1936 | France | 280/204 |
| 14829 | of 1898 | United Kingdom | 280/204 |
| 19900 | of 1902 | United Kingdom | 280/204 |
| 422768 | 1/1935 | United Kingdom | 280/204 |

*Primary Examiner*—John A. Pekar
*Attorney, Agent, or Firm*—Fleit, Jacobson, Cohn & Price

[57] ABSTRACT

A lightweight single wheel trailer is provided for towing behind a bicycle and including an upwardly opening wire mesh-type receptacle mounted forward of the rear wheel of the trailer. The rear end of the trailer includes opposite side rearwardly projecting arms between whose rear ends the rear wheel of the trailer is journalled and an upright standard is disposed to the rear of the receptacle and includes opposite side inclined braces extending between the upper end of the standard and the rear ends of the wheel journalling arms. The forward end of the trailer includes an upstanding gooseneck tongue and the receptacle constitutes bracing between the upper end of the standard and at least a mid-height portion of the tongue. Further, the forward end of the tongue includes a hitch assembly for coupling the forward end of the tongue to the upstanding seat supporting shank of an associated bicycle.

13 Claims, 2 Drawing Sheets

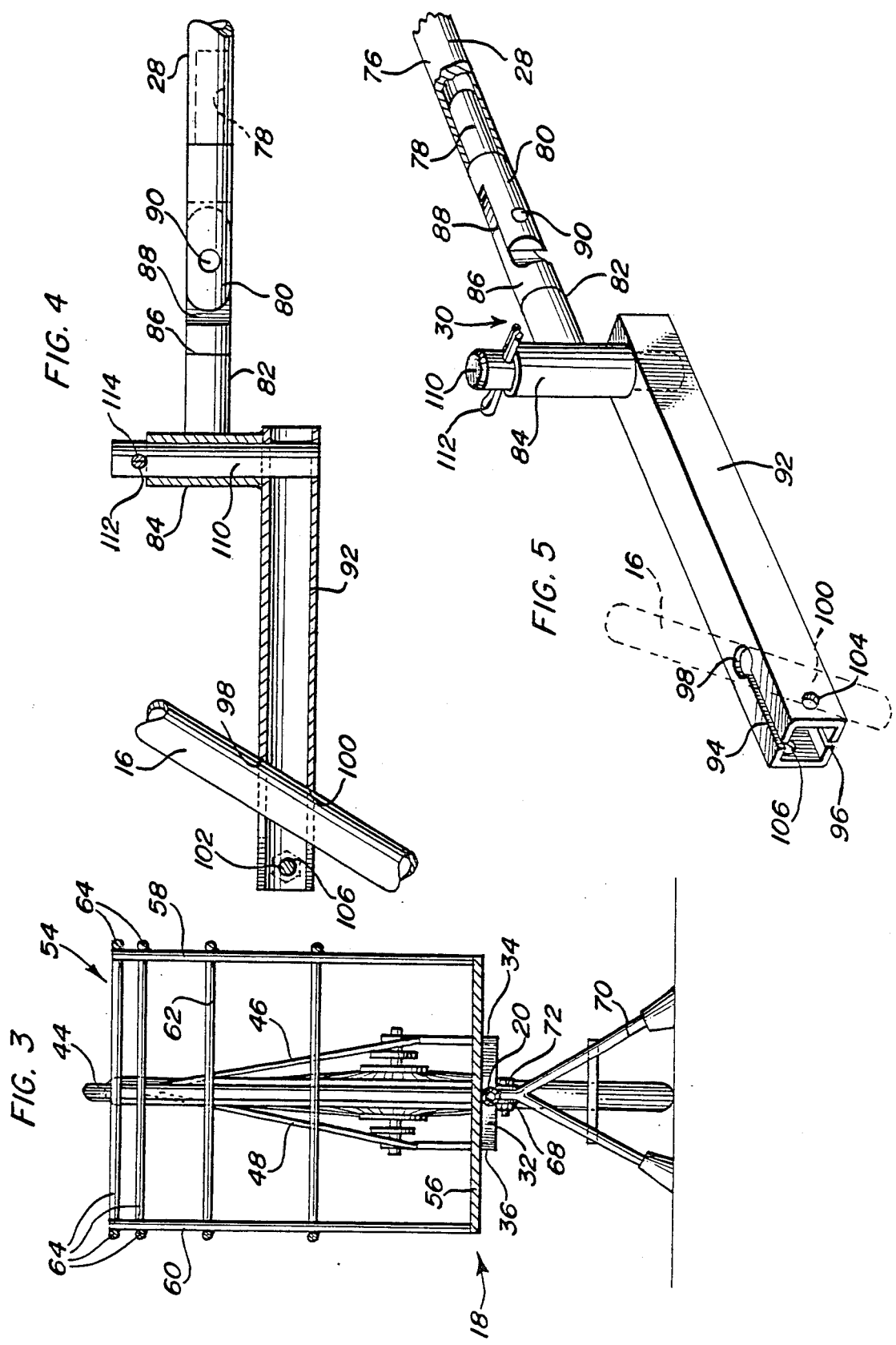

BICYCLE TRAILER

BACKGROUND OF THE INVENTION

1. Field of the Invention

This invention relates to a trailer specifically designed to be hitched to and trailed behind a cycle such as a motorcycle or a bicycle with no structural modification of the bicycle or motorcycle being required and with the trailer being of lightweight construction and yet adapted to support reasonably heavy loads.

2. Description of Related Art

Various different forms of lightweight trailers heretofore have been provided such as those disclosed in U.S. Pat. Nos. 2,571,595, 3,562,249, 3,877,723, 4,266,793 and 4,511,155. However, these previously known forms of bicycle and motorcycle trailers do not incorporate the combination of structural features of the instant invention which particularly well adapt the latter for use as a lightweight bicycle or motorcycle trailer.

SUMMARY OF THE INVENTION

The trailer of the instant invention includes a lightweight underslung main frame, a forward goose-neck tongue portion for universal connection with the seat supporting shank of a bicycle or a rear hitch mounting portion of a motorcycle and the rear of the main frame includes an upright standard. A lightweight upwardly opening receptacle is supported from the main frame intermediate the standard and the goose-neck and includes upper marginal portions anchored relative to the upper end of the standard and a mid-height portion of the goose-neck and thereby functions as a receptacle for receiving articles to be disposed therein as well as bracing between the upper portion of the upright standard and at least the mid-height portion of the goose-neck tongue.

The rear of the main frame includes a pair of rigid laterally spaced and rearwardly projecting wheel mounting arms between the rear ends of which a single rear wheel is journalled and opposite side, laterally spaced and rearwardly and downwardly inclined braces are connected between the rear ends of the arms and the upper end portion of the standard. In addition, a mounting plate is supported between the upper ends of the braces and supports a caliper-type brake assembly for the trailer wheel. In addition, the forward end of the main frame includes a retractable stand assembly.

The main object of this invention is to provide a lightweight trailer for trailing behind a bicycle or motorcycle and which will lean with the cycle when executing turns. However, the connection between the forward end of the goose-neck tongue of the trailer and a bicycle is such that relative steering angulation between the frame of the associated bicycle and the trailer frame automatically functions to reduce leaning of the trailer during sharp turning movements of the bicycle and trailer combination. In fact, as the steering angle between the bicycle and trailer increases toward a 90° angle during a sharp leaning turn of the bicycle, the lean angle of the trailer is reduced toward zero.

The main object of this invention is provide a lightweight trailer for trailing behind a bicycle or motorcycle.

Another object of this invention is to provide a trailer bicycle of lightweight construction, but which may support reasonably heavy loads.

Still another important object of this invention is to provide a lightweight bicycle trailer including provisions for trailer wheel braking.

A further object of this invention is to provide a bicycle trailer with a retractable front stand portion.

A still further object of this invention is to provide a bicycle trailer including coupling structure for coupling the goose-neck tongue of the trailer to an associated bicycle seat support shank in a manner whereby the leaning angle of the trailer during sharp turns of the bicycle and trailer combination is gradually reduced relative to the leaning angle of the bicycle as the turning angle between the bicycle and trailer approaches 90°.

Another object of this invention in accordance with preceding object is to provide a lightweight trailer also for use behind a motorcycle.

A final object of this invention to be specifically enumerated herein is to provide a bicycle trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse vertical sectional view taken substantially upon the plane indicated by the section line 3—3 of FIG. 2;

FIG. 4 is an enlarged fragmentary longitudinal vertical sectional view illustrating the coupling structure by which the forward end of the goose-neck tongue of the trailer is coupled to the seat supporting shank of the associated bicycle; and FIG. 5 is a fragmentary perspective view of the assemblage illustrated in FIG. 4.

DESCRIPTION OF THE PREFERRED EMBODIMENTS

Figures 1, 2:
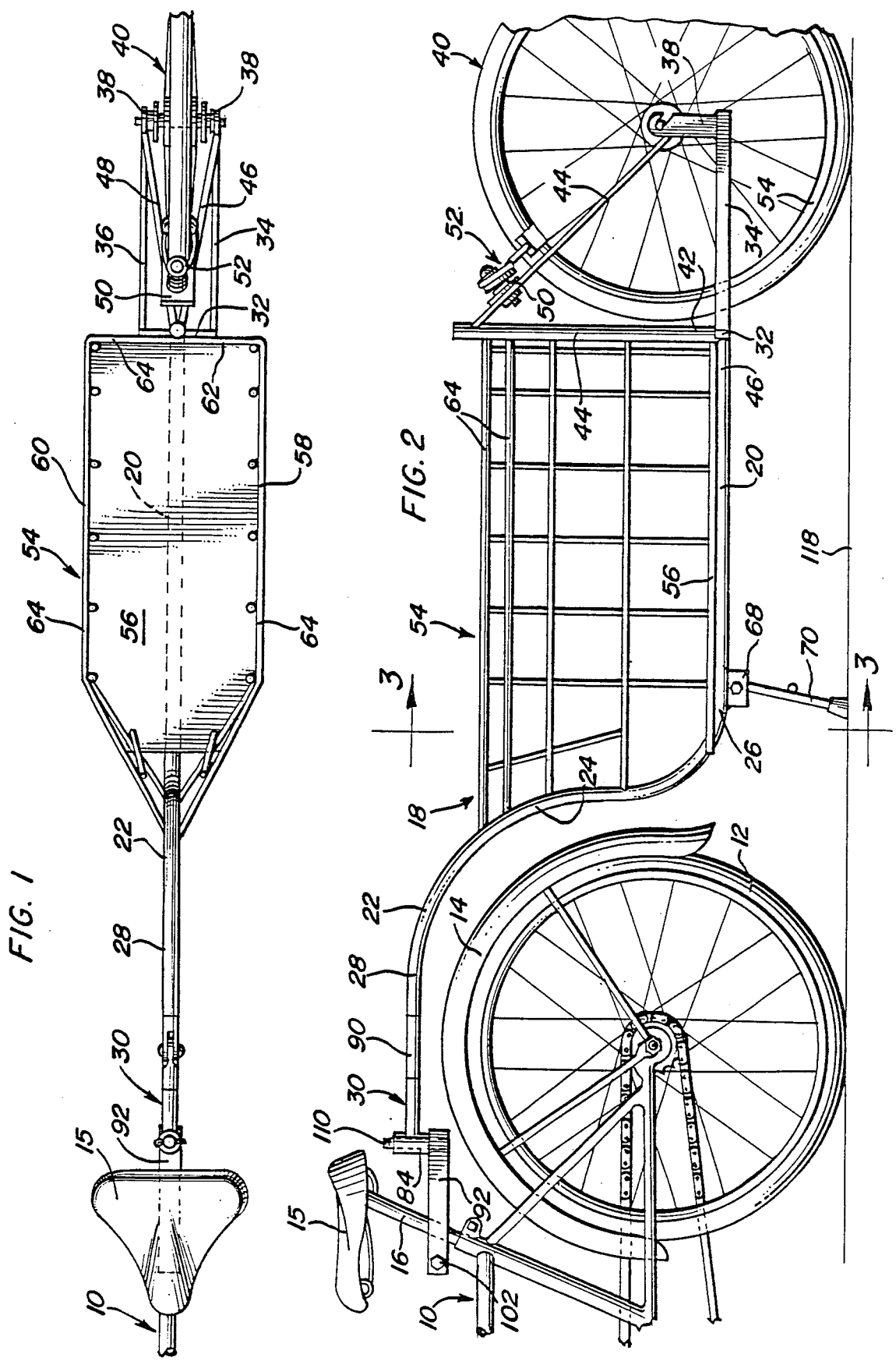
FIG. 1 is a top plan view of a trailer constructed in accordance with the present invention and with the trailer coupled to the rear end portion of a conventional form of bicycle and with the rear portion of the wheel of the trailer broken away.
FIG. 2 is a side elevational view of the assemblage illustrated in FIG. 1 with the support stand of the trailer in a lowered position so as to support both the trailer and the associated bicycle in an upright position.

Referring now more specifically to the drawings, the numeral 10 generally designates a conventional form of bicycle including a rear wheel 12, rear fender 14 disposed over the upper peripheral portion of the wheel 12 and a rearwardly and upwardly inclined seat supporting shank 16 supporting an upper end seat 15.

The trailer of the instant invention is referred to in general by the reference numeral 18 and includes an underslung, lightweight central longitudinal main frame 20. A forward goose-neck tongue 22 is provided and includes an upstanding lower portion 24 whose lower end is supported from the forward end 26 of the main frame 20 and whose upper portion 28 extends forwardly from the lower portion 24 over the fender 14. The forward extremity of the upper portion 28 supports a hitch construction referred to in general by the reference numeral 30 to be more fully hereinafter set forth.

The rear end of the main frame 20 includes a transverse member 32 supported therefrom and the forward ends of a pair of opposite side longitudinally extending wheel support arms 34 and 36 are secured to the opposite ends of the transverse member 32 and project rearwardly therefrom. The rear ends of the wheel support arms 34 and 36 include upstanding mounts 38 between whose upper ends a rear wheel assembly referred to in general by the reference numeral 40 is journalled.

The lower end 42 of an upright standard 44 is anchored relative to the rear end 46 of the main frame 20 and a pair of opposite side, rearwardly and downwardly inclined elongated braces 46 and 48 extend and are anchored between the upper end of the standard 44 and the corresponding members 38. In addition, a mounting plate 50 extends and is secured between the upper ends of the braces 46 and 48 and supports a caliper-type brake assembly 52 in operative association with the rim 54 of the wheel assembly 40. The brake assembly 52 may be cable actuated by a conventional form of actuating cable (not shown) and brake actuating lever (not shown) supported at a convenient location on the bicycle 10.

The main frame 20 supports an upwardly opening receptacle referred to in general by the reference numeral 54 including a bottom wall 56 overlying and supported from the main frame 20 and anchored to the transverse member 32 and the receptacle 54 includes heavy wire mesh opposite side walls 58 and 60 as well as a heavy wire mesh rear transverse wall 62. The walls 58, 60 and 62 include double upper marginal wire members 64 whereby the upper margins of the walls 58, 60 and 62 are reinforced and at least the upper marginal portion of the rear wall 62 is anchored relative to the upper end portion of the standard 44 and the forward ends of the upper margins of the side walls 58 and 60 defined by the corresponding wire members 64 are anchored relative to a mid-height portion of the gooseneck tongue 22. Further, the lower marginal portions of the walls 58, 60 and 62 are anchored relative to the flooring or bottom wall 56. Accordingly, the upper marginal portions of the walls 58, 60 and 64 define reinforcement between the upper portion of the standard 44 and the mid-height portion of the goose-neck tongue 22.

A bifurcated mount 68 is dependingly supported from the forward end of the main frame 20 and pivotally supports an upwardly retractable inverted U-shaped stand 70 therefrom through the utilization of a pivot fastener 72. The stand 70 may be either frictionally retained in adjusted rotated positions or lightly spring biased toward an upwardly swung horizontal position immediately underlying the main frame 20 through any convenient form of spring means (not shown).

With attention now invited more specifically to FIGS. 4 and 5 of the drawings, it may be seen that the forward end 76 of the upper portion 28 of the tongue 22 is tubular and has a diametrically reduced shank portion 78 of a bifurcated fitting 80 secured therein. In addition, a T-shaped fitting 82 is provided and includes a vertical tubular cross-head 84 and a horizontally rearwardly projecting shank 86 terminating rearwardly in a transversely reduced portion 88 pivotally secured between the furcations of the fitting 80 by a pivot pin 90.

A tubular front-to-rear extending support arm 92 is provided and is vertically split at its forward end by longitudinal vertical slots 94 and 96 formed in the upper and lower walls thereof. The slots 94 and 96 extend rearwardly from the forward end of the support arm 92 and terminate rearwardly at vertical bores 98 and 100 formed in the upper and lower walls of the support arm 92, the vertical bore 98 being displaced slightly rearward of the location of the bore 100. The bores 98 and 100 snugly receive the seat supporting shank 16 of the bicycle 10 therethrough and a clamp-type fastener 102, see FIG. 2, is secured through transversely registered bores 104 and 106 formed in the opposite side walls of the support arm 92 forward of the bore 100. Thus, the fastener 102 functions as a clamp-type fastener to securely clamp the forward end of the support arm 92 to the seat support shank 16.

The rear end of the support arm 92 supports an upwardly projecting shank 110 therefrom and the tubular cross head 84 is slidingly and rotatably mounted on the shank 110 below a removable retaining pin 112 secured through a transverse bore 114 formed in the shank 110.

In operation, once the support arm 92 has been mounted on the seat support shank 16, assuming that the trailer 18 is supported from the support surface 118 therefor by the stand 70, it is merely necessary to back the bicycle 10 beneath the tongue 22 and to remove the pin 112. Thereafter, the hitch construction 30 may be grasped in order to slip the cross-head 84 downwardly over the shank 110. Thereafter, the pin 112 may be replaced and the stand 70 may be retracted.

Because of the unique manner in which the receptacle 54 braces the upper end of the standard 44 relative to the mid-height portion of the tongue 22, a considerable load may be carried in the receptacle 54, even though the trailer 18 is of lightweight construction. In addition, because of the specific structural features of the hitch construction 30, even though the bicycle 10 may be leaned excessively relative to the surface 118 during a sharp turn, the amount the trailer 18 is leaned relative to the surface 118 will be gradually reduced as the turning angle between the bicycle and trailer is increased toward 90°.

If the trailer 18 is to be used in conjunction with a motorcycle including a rear hitch portion equipped with an upstanding shank such as the shank 110, the trailer 18 is constructed with a forwardly projecting tongue portion including a forward end such as the forward end 76 and in which a diametrically reduced shank portion such as that indicated at 78 is secured. In addition, the components 80, 82, 84, 86, 88 and 90 also will be used with the component or tubular cross-head of the motorcycle trailer corresponding to the cross-head 84 being downwardly telescoped over and rotatable on the aforementioned upwardly projecting shank corresponding to the shank 110 carried by the motorcycle.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A trailer for use behind a bicycle, said trailer including a lower horizontal main frame having front and rear ends and a forward upstanding goose-neck including a lower end portion extending upwardly from said forward end and a forwardly projecting upper end portion, said upper end portion including hitch means for universal connection with the seat mounting portion of a bicycle and with said forward end portion extending rearwardly from said seat mounting portion over the rear wheel of said bicycle and said lower end portion extending downwardly behind said rear wheel, an upright standard having an upper end and a lower end mounted rigid with said rear end of said main frame, an upwardly opening load receiving receptacle including a bottom wall supported from and extending along said main frame, upstanding side walls extending upward from opposite longitudinal margins of said bottom wall and a rear wall extending upward from a rear margin of said bottom wall, said side and rear walls including interconnected upper marginal portions, at least the central portion of the upper marginal portion of said rear wall being anchored to said standard, at least the forward end portions of said side wall upper marginal portions being anchored to said goose-neck above said bottom wall, a pair of front-to-rear extending opposite side and laterally spaced apart wheel support arms including front ends anchored to the rear end of said main frame and rear ends provided with wheel mounting structures, a rear wheel disposed between said arms and journalled from said wheel mounting structures, and a pair of opposite side rearwardly and downwardly inclined elongated bracing members disposed on opposite sides of said wheel and including upper ends anchored relative to the upper end of said standard and lower ends anchored relative to the rear ends of the corresponding wheel support arms.

2. The trailer of claim 1 wherein said hitch means includes a short forwardly projecting shank pivotally supported from the forward terminus of said gooseneck upper end portion for oscillation relative thereto about a horizontal transverse axis and pivot means for pivotally mounting the forward end of said shank from a bicycle for oscillation relative thereto about an upstanding axis.

3. The trailer of claim 2 wherein said pivot means includes a front-to-rear extending horizontal arm including means at its forward end for attachment to the seat supporting shank of a bicycle and pivot connection means establishing a pivot connection between the rear end of said horizontal arm and the forward end of said shank.

4. The trailer of claim 3 wherein said pivot means includes a generally vertical shaft carried by the rear end of said horizontal arm and a vertical sleeve carried by the forward end of said shank rotatable relative to said shaft.

5. The trailer of claim 4 wherein at least the forward end of said horizontal arm is tubular, registered upper and lower bores formed through upper and lower surface portions of the forward end of said horizontal arm and through which a bicycle seat support shank may be snugly received, said upper and lower portions of said support arm forward of said bores being longitudinally slotted, and a clamp-type fastener secured horizontally transversely through the foward end of said support arm forward of said bores.

6. The trailer of claim 5 wherein said standard is vertically disposed.

7. The trailer of claim 6 including a retractable stand projecting downwardly from the forward end of said main frame for support of the forward portion of said trailer from a support surface upon which said wheel is supported.

8. The trailer of claim 7 including a bracing plate supported from and interconnecting the upper ends of said braces and mounting a caliper-type brake assembly therefrom operatively associated with said wheel.

9. The trailer of claim 1 wherein said receptacle opposite side and rear walls are constructed of having gauge wire mesh.

10. The trailer of claim 9 wherein the upper marginal portions of said opposite side and rear walls include double wire members extending therealong.

11. The trailer of claim 1 wherein said standard is vertically disposed.

12. The trailer of claim 1 including a retractable stand projecting downwardly from the forward end of said main frame for support of the forward portion of said trailer from a support surface upon which said wheel is supported.

13. The trailer of claim 1 including a bracing plate supported from and interconnecting the upper ends of said braces and mounting a caliper-type brake assembly therefrom operatively associated with said wheel.

* * * * *